(12) United States Patent
Döring

(10) Patent No.: US 10,775,291 B2
(45) Date of Patent: Sep. 15, 2020

(54) DEVICE AND METHOD FOR DETERMINING AN ABSORPTION CAPACITY OF AN OXYGEN ABSORBER

(71) Applicant: B. Braun Avitum AG, Melsungen (DE)

(72) Inventor: Stefan Döring, Dresden (DE)

(73) Assignee: B. BRAUN AVITUM AG, Melsungen (DE)

( * ) Notice: Subject to any disclaimer, the term of this patent is extended or adjusted under 35 U.S.C. 154(b) by 103 days.

(21) Appl. No.: 16/242,652

(22) Filed: Jan. 8, 2019

(65) Prior Publication Data

US 2019/0212245 A1     Jul. 11, 2019

(30) Foreign Application Priority Data

Jan. 10, 2018    (DE) .................. 10 2018 100 462

(51) Int. Cl.
     *G01N 15/08*      (2006.01)
     *G01N 27/72*      (2006.01)

(52) U.S. Cl.
    CPC ............. *G01N 15/08* (2013.01); *G01N 27/72* (2013.01); *G01N 2015/0846* (2013.01)

(58) Field of Classification Search
    CPC ........ G01N 27/00; G01N 27/72; G01N 15/00; G01N 15/08; G01N 2015/0846;

(Continued)

(56) References Cited

U.S. PATENT DOCUMENTS

| 6,156,231 A | * | 12/2000 | McKedy | ............... A23L 3/3436 252/188.28 |
| 9,562,986 B2 | | 2/2017 | Peyton et al. | |

(Continued)

FOREIGN PATENT DOCUMENTS

| EP | 0218259 A2 | 4/1987 |
| JP | 2003149207 A | 5/2003 |
| JP | 2010271176 A | 12/2010 |

OTHER PUBLICATIONS

German Search Report for German Application No. 10 2018 100 462.1, dated Oct. 24, 2018, with English translation—14 pages.

(Continued)

*Primary Examiner* — Hoai-An D. Nguyen

(57) ABSTRACT

Devices for determining the absorption capacity of a metal-based oxygen absorber, preferably in the form of a sachet, comprising: a detector for detecting an electromagnetic field while the metal-based oxygen absorber is placed therein or moved relative thereto, preferably in uniform manner; and an evaluation unit which, on the basis of the measurement signal detected by the detector, determines the absorption capacity of the metal-based oxygen absorber, wherein the device further comprises a position and/or orientation sensing device which detects a position and/or an orientation of the metal-based oxygen absorber relative to the electromagnetic field; and wherein the evaluation unit corrects the measurement signal on the basis of the detected position and/or orientation of the metal-based oxygen absorber. In addition, a method for determining the absorption capacity of a metal-based oxygen absorber is disclosed.

10 Claims, 3 Drawing Sheets

(58) Field of Classification Search
CPC ........ G01B 11/00; G01R 29/00; G01R 29/08;
G01R 31/00; G01R 31/001; G01R
31/2813; G01R 31/2891; G01R 31/3274;
G01R 33/00; G01R 33/12
USPC .... 324/200, 219, 220, 226, 228, 260, 76.11,
324/144; 702/85, 94, 127, 150, 151;
73/1.01, 1.79; 340/500, 540
See application file for complete search history.

(56) References Cited

U.S. PATENT DOCUMENTS

| | | | | |
|---|---|---|---|---|
| 2007/0163917 | A1* | 7/2007 | Friesen | A61J 1/00 206/528 |
| 2007/0265593 | A1* | 11/2007 | Kitagawa | A61M 1/1686 604/403 |
| 2008/0000222 | A1* | 1/2008 | Hirata | B01J 27/053 60/297 |
| 2011/0248178 | A1* | 10/2011 | Haffner | G01N 21/3103 250/373 |

OTHER PUBLICATIONS

European Search Report for European Application No. 19150994.2, dated Apr. 17, 2019 with translation, 9 pages.

* cited by examiner

DEVICE AND METHOD FOR DETERMINING AN ABSORPTION CAPACITY OF AN OXYGEN ABSORBER

CROSS REFERENCE TO RELATED APPLICATIONS

This application claims priority to German application DE 10 2018 100 462.1, filed Jan. 10, 2018, the contents of such application being incorporated by reference herein.

FIELD OF THE INVENTION

The invention relates to a device for determining an absorption capacity of a metal-based, preferably iron-based oxygen absorber, preferably in the form of a sachet, comprising a detector for detecting an electromagnetic field while the metal-based oxygen absorber is placed therein or moved relative thereto, preferably in uniform manner; and an evaluation unit which, on the basis of the measurement signal detected by the detector, determines the absorption capacity of the metal-based oxygen absorber. In addition, the invention relates to a method for determining the absorption capacity of a metal-based oxygen absorber according to the coordinated claim.

BACKGROUND OF THE INVENTION

The presence of oxygen in packaging is often undesirable for various reasons. For example, products from the medical technology or food sectors in particular require the absence of oxygen for reasons of shelf life or production. Examples include artificial nutrition and the gamma sterilization of dialyzers. This absence of oxygen is usually achieved through the absorption of oxygen by iron or iron compounds. Usually, a sachet (bag) is filled with iron powder in which the oxygen has access to the iron powder (absorber) via a membrane. The binding process is mostly irreversible here, so that the bound oxygen is not released again. This allows to achieve the absence of oxygen/freedom from oxygen in a predefined volume.

It is difficult to identify an oxygen absorber that has already used up its capacity for various reasons, such as leaking transport packaging or too long storage outside a protective atmosphere during processing. A resulting presence of oxygen in a product package, for example, has a negative effect on the quality and/or shelf life of a product packaged therein.

In order to determine the absorption capacity/capacity/residual capacity of the oxygen absorber/absorber and thus for the quality assurance of the product, it is necessary to be provided with a suitable parameter which is clearly related to the absorption capacity of a sachet.

Each sachet contains a defined amount of the absorbent/absorber (iron), which can bind a corresponding amount of oxygen according to stoichiometric laws. The occurring reaction is exothermic. The additionally bound oxygen leads to a mass increase of the sachet. The parameter "temperature" cannot be used because the sachet cools down to the ambient temperature after the exothermic reaction with the oxygen and a history of the temperature is not recorded. On the one hand, the parameter "mass increase" is difficult to determine due to the small change in mass and, on the other hand, due to manufacturing tolerances, each individual sachet would have to be recorded and marked immediately after its production and its mass determined before use. An increase in mass could (however not clearly) be attributed to a reacted absorbent or the bound oxygen.

DESCRIPTION OF RELATED ART

From prior art, a method is known for ensuring a minimum capacity of a sachet during production. Document JP 2010-271176 A reveals such a method in which an absorber manufactured on rolled material is guided by a guide rail and moved through a ring detector/ring coil. The ring coil detects a signal by means of which it is determined whether a residual capacity or absorption capacity for oxygen is sufficient. The parameter here is a disturbance or a signal of an electromagnetic or magnetic field. An oxygen absorber with a low absorption capacity or a reacted oxygen absorber reacts with another, in particular a lower, field disturbance than an oxygen absorber with a high absorption capacity. Thus, the disturbance of an electromagnetic field caused by an oxygen absorber (sachet) can be used to assess the capacity of an iron-based oxygen absorber.

However, the disadvantage is that the method can only be used for producing the sachet and not at a time after production. For example, it is not possible to determine the remaining absorption capacity of the sachet, which is arranged as a component in a product package. The position of the sachet or the absorber to be tested within the ring coil influences the measurement signal more strongly than the absorption capacity of the oxygen absorber. Although this can be remedied by a defined position, for example by fixing the absorber, this is difficult to achieve from a production-related point of view, since the absorber is usually located at an undefined position/place and undefined orientation/alignment/location within the packaging. Although the absorber can also be fixed inside the packaging, it is complex and difficult to guide the packaging exactly through the ring coil. Any deviation of the absorber position in relation to the ring coil leads to deviations in the measuring signal and thus to the uselessness of the measured value. This undefined position and/or orientation would make it possible to check the presence, but not the capacity of the oxygen absorber in the case of the otherwise metal-free product package.

SUMMARY OF THE INVENTION

It is therefore the object of the invention to avoid or at least reduce the disadvantages arising from the prior art and, in particular, to make available a device and a method which allows the absorption capacity of an oxygen absorber to be determined simply, safely and non-destructively, even after production and, in particular, in the case of packaging with a sachet, for example, at the place of use (in situ).

With regard to the device, the object of a generic device for determining the absorption capacity of a metal-based oxygen absorber is achieved according to the invention by the device having a position and/or orientation sensing device which detects a position and/or a (three-dimensional) orientation/alignment/location of the metal-based oxygen absorber relative to the electromagnetic field, the evaluation unit correcting the measurement signal on the basis of the detected position and/or orientation of the metal-based oxygen absorber.

In contrast to the prior art known to date, the present invention therefore uses the position and/or orientation sensing device in order to detect a position and/or orientation in addition to the measurement signal detected/acquired by the detector before, during or after the detection of the measurement signal. What is important here is that the detected position and/or orientation can be transformed/calculated back to the point in time at which the detector detects the electromagnetic field while the oxygen absorber is moved or placed relative to the electromagnetic field. The evaluation unit then corrects the measurement signal based on the detected position and/or orientation of the metal-based oxygen absorber.

By determining the (residual) absorption capacity of the oxygen absorber, a valuable contribution to the quality assurance of the product arranged in the product package can be made, especially when the oxygen absorber is placed in a product package. The device according to the invention can therefore also be used to determine the absorption capacity on site (at the place of use of the product). A defined position and/or orientation of the oxygen absorber for a determination of the absorption capacity is no longer mandatory due to the device according to the invention, so that, for example in a product package, the absorption capacity of the oxygen absorber can also be determined reliably and easily if the latter has an undefined position and/or orientation.

Advantageous embodiments are claimed in the subclaims and are explained below.

In a preferred embodiment, the position and/or orientation sensing device may comprise a camera system, in particular a 3D camera system or a stereo camera system, which detects an area in or around the detector to optically register the oxygen absorber in three dimensions, and/or a laser measurement sensor for detection. In particular by arranging two cameras, which cover the same area, at an angle to each other, a structure like that of an oxygen absorber can be detected in three dimensions. It is important that the position and/or orientation of the oxygen absorber is detected relative to the electromagnetic field or preferably relative to the detector.

The evaluation unit is preferably adapted to correct the measurement signal on the basis of (reference) data stored in a memory of the evaluation unit, based on the recorded position and/or orientation of the oxygen absorber. By, for example, previous experimental tests, simulations or calculations, data can be obtained on positions and/or orientations of an oxygen absorber, which can then be stored in the memory as reference data. The evaluation unit has access to said data and can use it to calculate/determine the absorption capacity or at least determine that the absorption capacity of the oxygen absorber, which is moved through or placed in the electromagnetic field, is insufficient.

It is preferred if the evaluation unit is adapted to carry out such a correction of the detected measurement signal (measured value correction) on the basis of the data stored in the memory and on the basis of the detected position and/or orientation that, on the basis of the detected measurement signal, the evaluation unit calculates (backwards) a standardized measurement signal of a standard orientation and a standard position of the oxygen absorber in order to determine the absorption capacity of the oxygen absorber. Starting from an undefined position and/or orientation of the oxygen absorber, the evaluation unit can calculate the measurement signal back to a standardized measurement signal of an oxygen absorber which would be moved to a defined (standard) position and/or (standard) orientation. This corrects or removes the position and/or orientation parameters from the measurement signal and the position and/or orientation parameters are not or only partially relevant for determining the absorption capacity.

It is advantageous that, if the standardized measurement signal is lower than a minimum standard value stored in the memory, the evaluation unit determines that the absorption capacity of the oxygen absorber is too low. By setting a minimum standard value and thus a lower limit, a minimum requirement for the absorption capacity of the oxygen absorber can easily be set. If this minimum requirement is not met, a warning message can be issued, for example, or the product can be withdrawn from further use immediately.

Preferably, minimum values for a defined range in terms of the position and/or orientation may be stored in the memory as data, and the evaluation unit may be adapted to compare the acquired measurement signal with the associated minimum value of the acquired range of position and/or orientation and, if the measurement signal is lower than the associated minimum value, the evaluation unit may determine that the absorption capacity of the oxygen absorber is too low. Data which corresponds to minimum requirements for the absorption capacity of the oxygen absorber has been collected to this end, for example in previous tests, and stored in the memory. If these (minimum) measurement signals are not reached depending on the recorded position and/or orientation and thus not met, the evaluation unit determines that the absorption capacity is insufficient.

In a preferred embodiment, the device may have a conveyor, in particular a conveyor belt, with which the oxygen absorber is moved through the detector so that the movement of the oxygen absorber through the detector is repeatable and in particular linear and uniform at a constant, defined speed. A conveyor ensures that the movement of the oxygen absorber through the detector is repeatable and defined, so that further measurement errors and measurement deviations are avoided in advance.

Advantageously, the detector may have a detector coil system with at least two coils, where one of the at least two coils is a transmitting coil and one of the at least two coils is a receiving coil. In particular, the oxygen absorber is moved through these coils. While the transmitting coil generates the predefined (electro-)magnetic field, the receiving coil detects the electromagnetic field and thus also a change in the electromagnetic field during the movement or placement of the oxygen absorber.

It is preferred if the detector coil system comprises a transmitting coil and two receiving coils each having an opening, preferably of the same size, which are lined up/arranged one behind the other as seen in the longitudinal direction of the detector so that the openings are aligned with each other, and the one transmitting coil is arranged between the two receiving coils. This system is particularly suitable for determining the absorption capacity of the oxygen absorber.

In a preferred embodiment, the detector coil system may operate in an alternating current excitation mode, in which the transmitting coil performs an alternating current excitation and the receiving coil detects the measurement signal, so that the evaluation unit can determine the absorption capacity of the oxygen absorber via a detected amplitude and a phase position of the measurement signal and on the basis of the detected position and/or orientation.

Alternatively, a pulse measurement can be carried out by the detector coil system in a preferred embodiment, in which the transmitting coil periodically emits transmitting pulses of an (electro-)magnetic field and the receiving coil detects the measuring signal after switching off the transmitting pulse.

With regard to a generic method for determining the absorption capacity of a metal-based oxygen absorber, the object is achieved by the following steps: arranging a detector in space; moving the oxygen absorber through an electromagnetic field or preferably through the detector, detecting (a measurement signal) of the electromagnetic field by means of the detector when the oxygen absorber is moved through the electromagnetic field or the detector; detecting a position and/or an orientation of the oxygen absorber relative to the electromagnetic field or preferably relative to the detector; and determining the absorption capacity of the oxygen absorber based on the detected measurement signal and the detected position and/or orientation. The step of detecting a position and/or orientation of the oxygen absorber relative to the electromagnetic field or relative to the detector does not necessarily have to be performed at the above orientation, but can be rearranged chronologically. This step only has to be done before determining the absorption capacity of the oxygen absorber. For example, as a second step, the position and/or orientation can be determined and only afterwards the movement of the oxygen absorber through the electromagnetic field. The method can reliably detect both missing and already (partially) used oxygen absorbers in product package in particular and thus contributes significantly to quality assurance.

Preferably, a corresponding decay curve of the residual capacity can be assigned to the position and/or orientation of the metal-based oxygen absorber. These decay curves were previously determined for specific absorbers and stored in a database. The evaluation unit determines the position and/or location of the oxygen absorber and searches the database for the decay curve closest to the position and/or location. Preferably, the position and/or orientation of the absorber is assigned a minimum characteristic of signal interference from which the residual capacity of the absorber can be derived. In particular, the device must be taught-in or the database must be taught-in with different positions and/or orientations or decay curves in order to be able to determine the residual capacity.

Preferably, the detector or the ring coil or its cross-section through which the product including the oxygen absorber passes, can preferably be divided into a large number of (small) areas. The position and/or orientation detection device, in particular the stereo camera system, detects through which of the numerous areas of the oxygen absorber is guided. The decay curve stored for this area is identified from the database, in particular the decay curve determined empirically beforehand. This contains a minimum signal characteristic typical for this area, which is preferably assigned to a minimum capacity from preliminary tests. A comparison between a stored and a measured signal characteristic finally requires an indication of the residual capacity of the oxygen absorber.

BRIEF DESCRIPTION OF THE DRAWINGS

The invention is explained in more detail below using preferred exemplary embodiments with the help of Figures in which.

DETAILED DESCRIPTION OF PREFERRED EMBODIMENTS

The Figures are schematic in nature and should only serve the understanding of the invention. Identical elements are provided with the same reference signs. The characteristics of the various exemplary embodiments can be interchanged.

Figure 1:
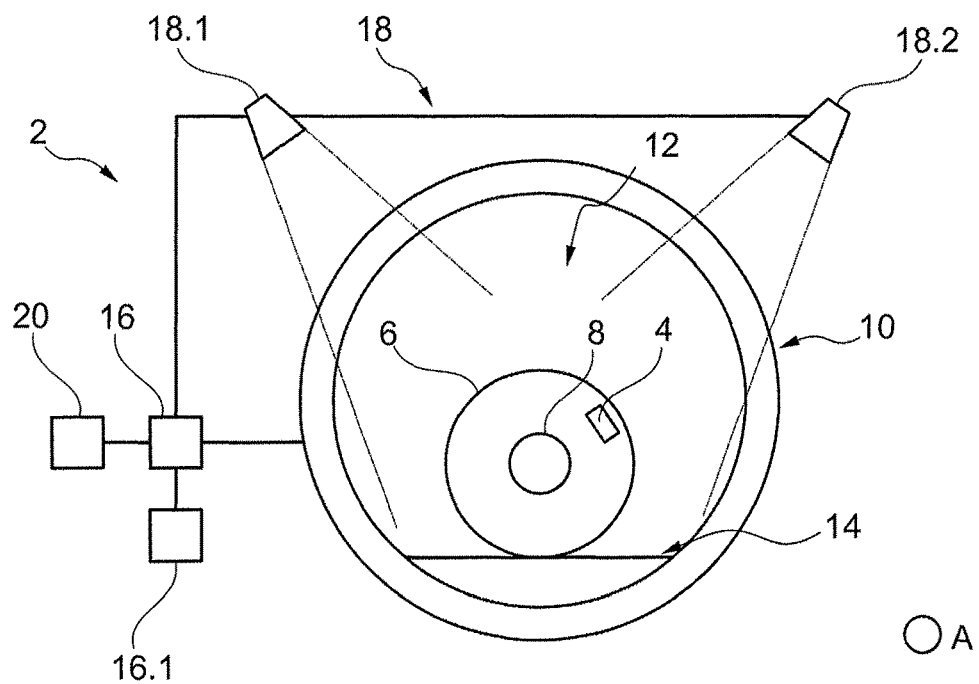
FIG. 1 shows in a schematic front view a device according to the invention of a first preferred embodiment.

FIG. 1 shows in a perspective, schematic representation in a front view a device 2 according to the invention for determining the absorption capacity of an iron-based oxygen absorber 4 of a first preferred embodiment. The oxygen absorber 4 is present here in the form of a sachet in a product package 6. In this product package 6, which is sealed in a gas-tight manner against the environment, a product 8 is arranged next to the sachet 4 and must be stored in the absence of oxygen in order to guarantee product quality and shelf life of the product 8. Both the product 8 and the product package 6 are non-metallic.

The product package 6 containing the product 8 and the sachet 4 is located in FIG. 1 in an inner region/an opening 12 of an annular detector/detector ring 10 of the device 2 for detecting an (electro)-magnetic field. More precisely, the product package 6 together with the sachet 4 is moved through the detector 10 in a direction normal to the area of the opening 12 or in a longitudinal direction A of the detector or opening 12. For a uniform, linear movement of the product package 6 through the detector 10, the device 2 has a conveyor 14 in the form of a conveyor belt, similar to a goods conveyor belt/checkout belt of a checkout in a supermarket. In a further, not represented embodiment, the detector can be alternately moved over the product package fixed in space and containing the product and the sachet. It is of course also possible that both the detector and the sachet in the product package move, the only important thing is that the detector and the sachet move relative to each other.

The conveyor belt 14 conveys or moves both the product package 6 and the sachet 4 evenly through the detector 10 at a defined speed. During this movement, the detector 10 detects the electromagnetic field in the area of the detector 10, which electromagnetic field changes due to the iron-based sachet 4 as the sachet 4 passes through the opening 12 of the detector 10. The device 2 also has an evaluation unit 16 which determines the absorption capacity of the sachet/oxygen absorber 4 on the basis of the measurement signal detected by the detector 10.

In contrast to the prior art known to date, the device 2 according to the invention also has a position and/or orientation sensing device 18 which detects a position and/or orientation of the sachet 4 relative to the electromagnetic field or, in this case, relative to the detector 10. In this embodiment, the position and/or orientation sensing device 18 has an optical recognition system working in the visible area of the light, which is designed as a stereo camera system. The stereo camera system 18 is shown only schematically in FIG. 1, but should not be disposed in the same plane as the detector 10 as seen in longitudinal direction A, so that the stereo camera system 18 in front of the detector 10 is able to detect a position and a orientation of the sachet 4 without the detector 10 obstructing the detection due to its geometry. Two cameras 18.1, 18.2 of the stereo camera system 18 are arranged in an upper area of the device 2 and are placed in FIG. 1 on the left and right opposite the longitudinal axis A respectively. The two cameras 18.1 and 18.2 are directed obliquely to the opening 12 of the detector 10, each camera optically capturing a two-dimensional image of the sachet 4 in the product package 6 in the case of a transparent product package 6. The two cameras are arranged at an angle to each other as seen around the longitudinal axis A.

The stereo camera system 18 is adapted to determine a three-dimensional image or virtual structure of the sachet 4 in the product package 6 from the two captured two-dimensional images of the two cameras 18.1 and 18.2. This three-dimensional image/structure enables the stereo camera system 18 to determine both a position and a orientation of the sachet 4 relative to the stereo camera system 18, and since the stereo camera system 18 is arranged in a defined manner relative to the detector 10, also a position and a orientation of the sachet relative to the detector 10.

The evaluation unit 16 is provided with both the detected position/orientation of the sachet 4 and the measurement signal of the detector 10 when the sachet 4 is moved through the electromagnetic field in the area of the opening 12 of the detector 10. The evaluation unit 16 also has a memory 16.1 in which data is stored which are used by the evaluation unit 16 in order to correct the measured value of the measurement signal recorded by the detector 10. In particular, the memory 16.1 holds data which provides a correction, or more precisely a correction value for the acquired measurement signal, for a specific range of a position, i.e. an orientation of the sachet 4 with respect to a standard orientation (standardized orientation) implemented by three angle specifications, a roll angle, a pitch angle and a yaw angle (as special Euler angles), and a specific range of a position, implemented by a coordinate specification in x, y and z directions in the Cartesian coordinate system (see FIG. 4). The evaluation unit 16 multiplies this correction value by the acquired measurement signal and as a result the evaluation unit 16 of the device 2 supplies an acquired normalized absorption capacity of the sachet 4. This means that the evaluation unit 16 calculates the measurement signal back to a normalized measurement signal of a normalized position and a normalized orientation on the basis of the data for the acquired position and the acquired orientation in each case, at which the sachet 4 would be moved through the detector 10 in a previously defined position and orientation.

The range of position is to be understood as a further subdivision into three subranges of the three angles (roll, pitch and yaw angles), which must be considered in combination with each other. For example, the roll angle of 360° can be divided into four subranges of 90° each. A finer division with 360 sub-areas in degree steps can also be made. The special combination of the sub-areas together with the captured position (x, y, z) corresponds exactly to a correction value stored in the memory.

This means that the position and orientation of the sachet 4 relative to the electromagnetic field or to the detector 10 is deducted by calculation and only the measurement signal remains, which the sachet 4 with an iron powder as content would deliver during a movement through the detector 10 (with standardized position and orientation). This allows the sachet 4 to be arranged anywhere in the product package and yet the device 2 according to the invention can reliably, accurately and easily determine the absorption capacity of the sachet 4.

The value of the specific absorption capacity of the sachet 4 is forwarded by the evaluation unit to an interface 20, for example to be shown on a display.

Figure 2:
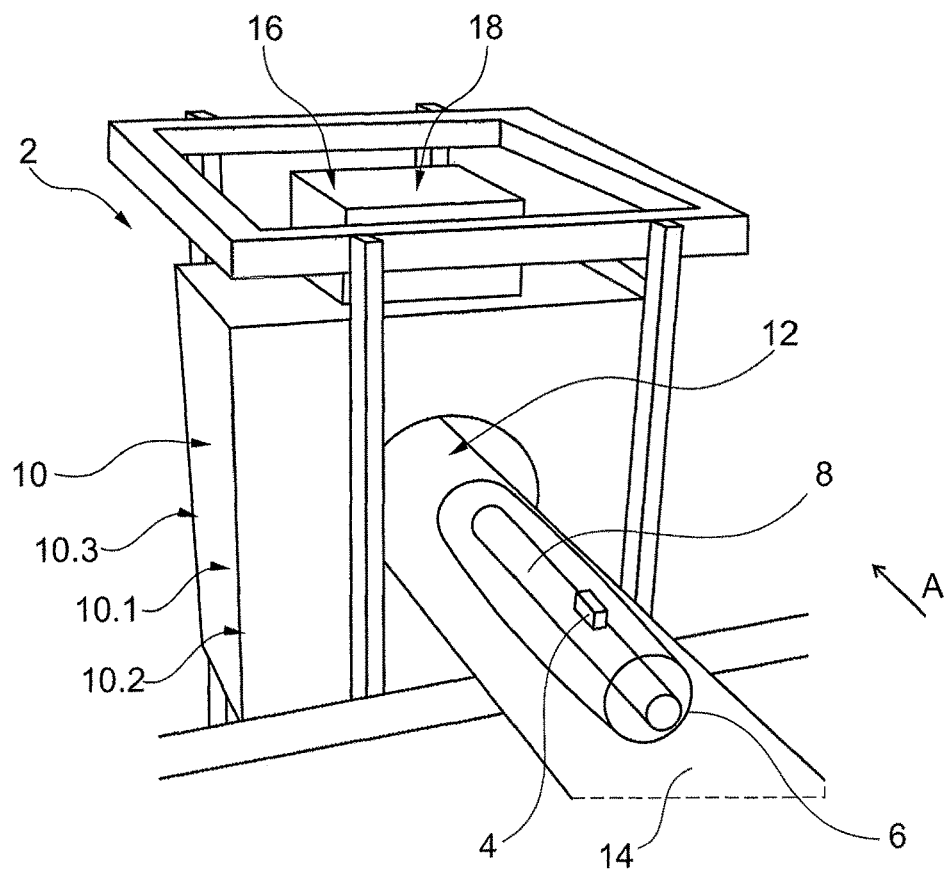
FIG. 2 shows in a perspective view a device according to the invention of another preferred embodiment.

FIG. 2 shows a device 2 according to the invention for determining the absorption capacity of a metal-based oxygen absorber 4 of another, second preferred embodiment. The device 2 has as detector 10 a coil system with three coils 10.1, 10.2, 10.3, which are indicated in broken lines in FIG. 3. One of the three coils is a transmitting coil 10.1, and two of the three coils are receiving coils 10.2, 10.3. The openings of the coils 10.1, 10.2, 10.3 are aligned in the direction of the longitudinal axis A/longitudinal direction A, and the transmitting coil 10.1 is arranged between the two receiving coils 10.2, 10.3 as seen in the direction of the longitudinal axis A.

The detector coil system of the second preferred embodiment works in the manner of an alternating current excitation, in which the transmitting coil 10.1 provides an alternating current excitation and the two receiving coils 10.2, 10.3 detect the measuring signal of the electromagnetic field, and via an amplitude and a phase position of the measuring signal the evaluation unit 16 together with the detected position and the orientation to determine the absorption capacity of the oxygen absorber 4. Also in this embodiment, the device 2 has a position and orientation sensing device 18 in the form of a camera system. In this embodiment, however, the camera system 18 is not arranged in front of or behind the detector 10, but the detector 10 has an opening in an upper area (not shown here) through which the camera system 18 can look into the interior/inner area/opening 12 of the detector 10 and can thus detect the position and orientation of the oxygen absorber 4 during its movement through the detector 10. The product package 6 together with the product 8 and the oxygen absorber is moved uniformly through the opening 12 of the detector 10 and parallel to the longitudinal axis A via the conveyor belt 14. The function of determining the absorption capacity of the oxygen absorber is the same as for the first preferred embodiment.

Figure 3:
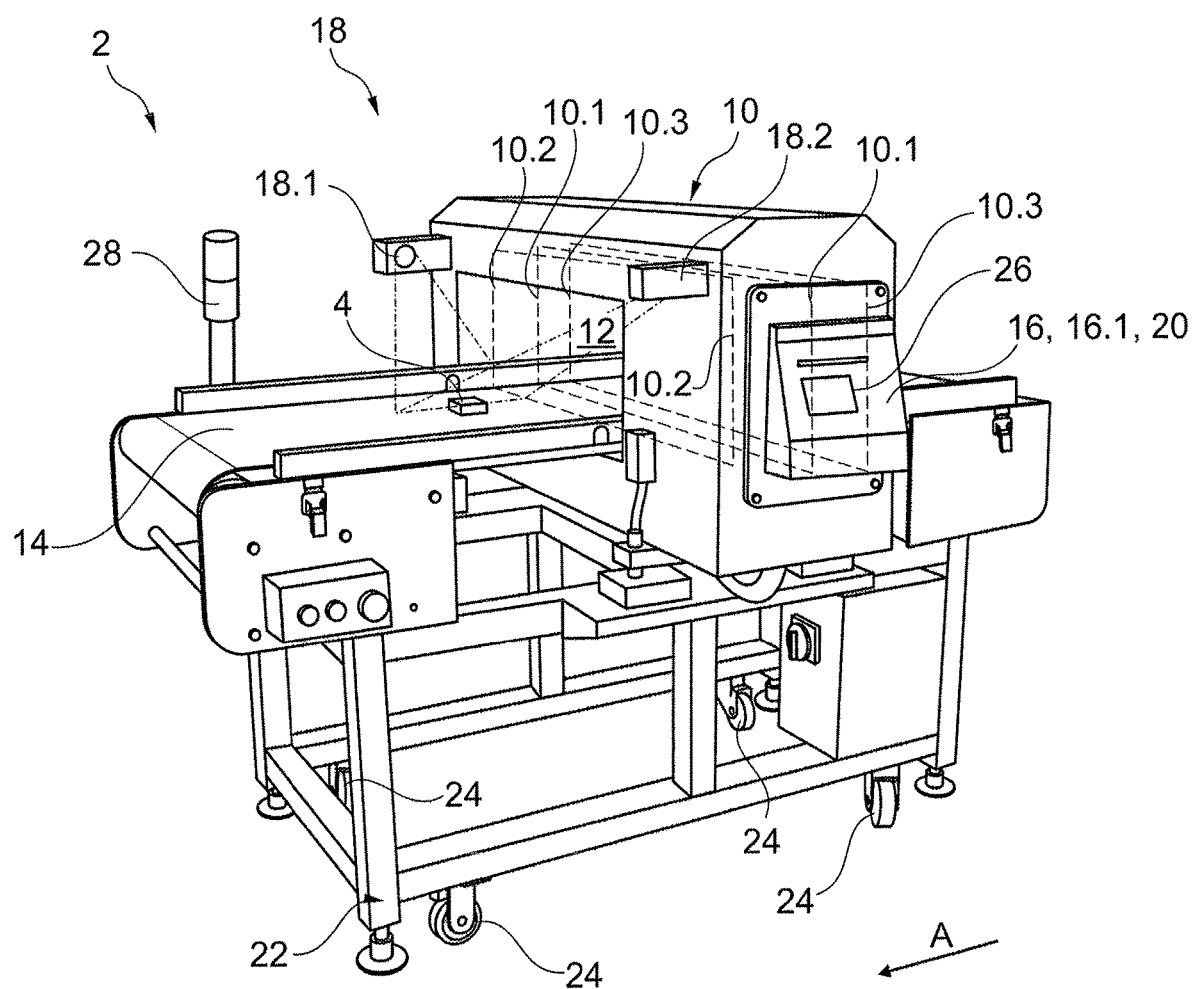
FIG. 3 shows in a perspective view a device according to the invention of a third preferred embodiment which is portable.

FIG. 3 shows a third preferred embodiment of a device 2 according to invention. This device 2 is provided with rollers 24 at a lower part of its frame 22, for portability of the device 2. The detector 10 again has an opening 12 to or through which again a conveyor belt 14 moves the oxygen absorber 4 parallel to the longitudinal axis A directly or indirectly via a product package 6 (not shown here). Downstream of the detector 10, two cameras 18.1 and 18.2 are again arranged above the conveyor belt 14 around the longitudinal axis A at an angle relative to each other, which both detect a common area in order to detect the position and the orientation of the oxygen absorber 4 which can also be placed directly on the conveyor belt. A display 26 shows the (residual) absorption capacity of the oxygen absorber 4, which is determined by the evaluation unit 16. If the absorption capacity is less than a set minimum value, an optical display 28 in the form of a red machine stop light illuminates.

Figure 4:
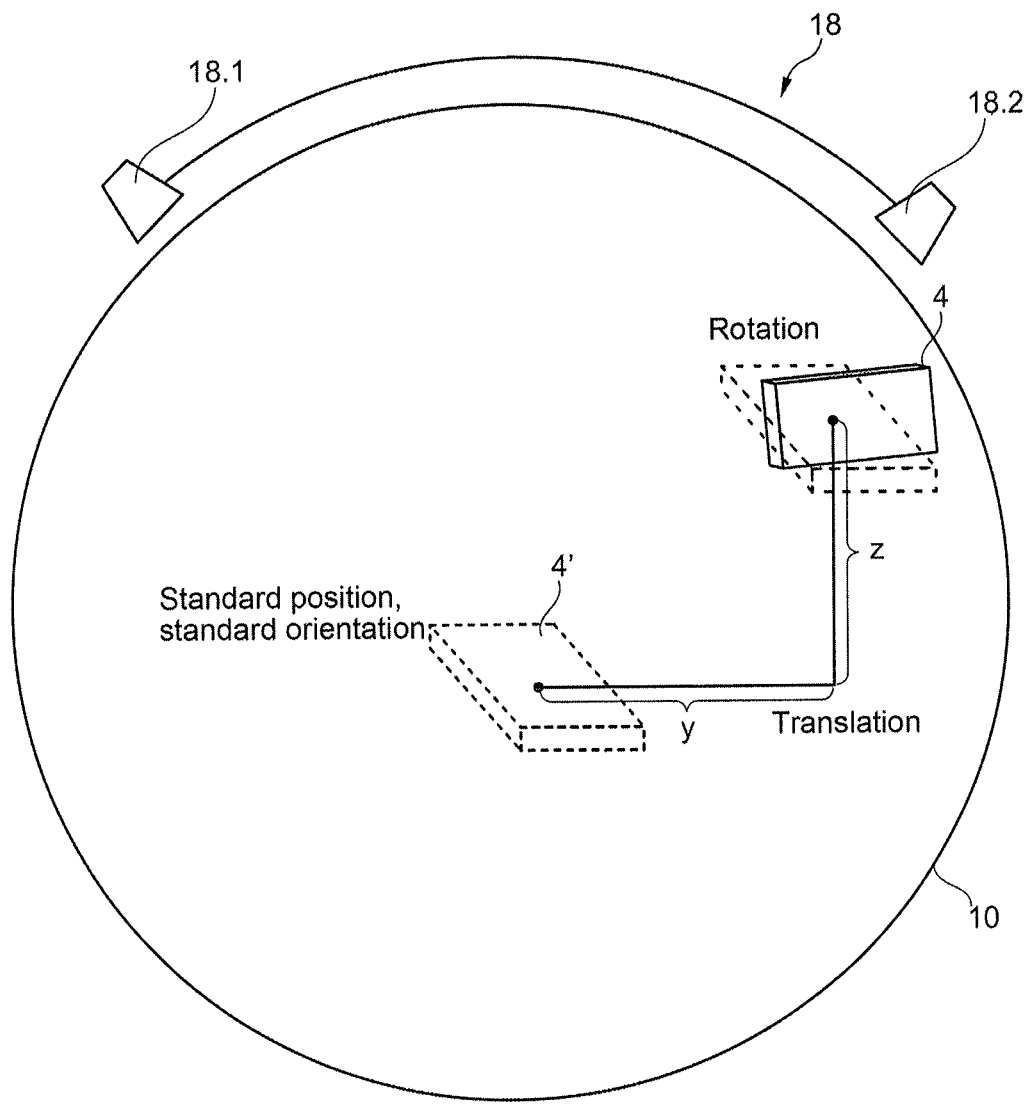
FIG. 4 shows in a schematic view an illustration of a detected position and orientation of an oxygen absorber relative to a standard position and standard orientation of the oxygen absorber.

FIG. 4 schematically shows a position and a orientation of an oxygen absorber 4 in relation to a standard orientation (normalized orientation) and a standard position (normalized position) of the oxygen absorber 4. With regard to the Cartesian coordinates for the position, it should be noted that only two coordinates (y, z) are necessary, since the oxygen absorber 4 is moved in the direction of the longitudinal axis A and thus in one coordinate direction, namely defined in the x-direction. The position of the standard orientation and position is achieved by a transformation with a corresponding rotation by the three angles (roll angle, pitch angle, yaw angle) and a corresponding translational movement in y and z direction starting from the captured position and orientation. A corresponding correction value is assigned to this transformation.

The invention claimed is:

1. A device for determining an absorption capacity of a metal-based oxygen absorber comprising:
   a detector for detecting an electromagnetic field while the metal-based oxygen absorber is placed therein or moved relative thereto;

a position and/or orientation sensing device; and an evaluation unit which, on the basis of the measurement signal detected by the detector, determines the absorption capacity of the metal-based oxygen absorber, wherein:

the position and/or orientation sensing device detects a position and/or an orientation of the metal-based oxygen absorber relative to the electromagnetic field; and wherein the evaluation unit corrects the measurement signal on the basis of the detected position and/or orientation of the metal-based oxygen absorber.

2. The device according to claim 1, wherein the position and/or orientation sensing device has a camera system which detects an area in or around the detector in order to optically register the oxygen absorber in three dimensions, and/or in that the position and/or orientation sensing device has a laser measurement sensor for detection.

3. The device according to claim 1, wherein the evaluation unit is adapted, on the basis of data which are stored in a memory of the evaluation unit, to correct the measurement signal on the basis of the detected position and/or orientation of the oxygen absorber.

4. The device according to claim 3, wherein the evaluation unit is adapted, on the basis of the data stored in the memory and on the basis of the detected position and/or orientation, to carry out such a correction of the detected measurement signal that the evaluation unit, starting from the detected measurement signal, calculates a normalized measurement signal of a standard position and a standard orientation of the oxygen absorber in order to determine the absorption capacity of the oxygen absorber.

5. The device according to claim 4, wherein, if the normalized measurement signal is less than a minimum standard value stored in the memory, the evaluation unit determines that the absorption capacity of the oxygen absorber is too low.

6. The device according to claim 3, wherein minimum values in terms of a defined range of the position and/or orientation are stored in the memory as data, and the evaluation unit is adapted to compare the acquired measurement signal with the associated minimum value of the detected range of the position and/or orientation, and if the measurement signal is less than the associated minimum value, the evaluation unit determines that the absorption capacity of the oxygen absorber is too low.

7. The device according to claim 1, wherein the device has a conveyor with which the oxygen absorber is moved through the detector, so that the movement of the oxygen absorber through the detector can be carried out in reproducible manner in linear and uniform fashion at a constant, defined speed.

8. The device according to claim 1, wherein the detector has a detector coil system with at least two coils, one of the at least two coils being a transmitting coil and one of the at least two coils being a receiving coil.

9. A device according to claim 3, wherein the detector coil system comprises a transmitting coil and two receiving coils each having an opening, which are lined up/arranged one behind the other as viewed in a longitudinal direction of the opening so that the openings are aligned with one another, and the one transmitting coil is arranged between the two receiving coils.

10. A method for determining the absorption capacity of a metal-based oxygen absorber comprising the steps:

arranging a detector in space;

moving the oxygen absorber relative to an electromagnetic field;

detecting a measurement signal of the electromagnetic field by means of the detector when the oxygen absorber is moved through the electromagnetic field;

detecting a position and/or an orientation of the oxygen absorber relative to the electromagnetic field; and determining the absorption capacity of the oxygen absorber.

* * * * *